Sept. 19, 1961 R. W. PITMAN 3,000,561
TEN KEY ADDING AND SUBTRACTING MACHINE
Filed Dec. 12, 1955 7 Sheets-Sheet 4
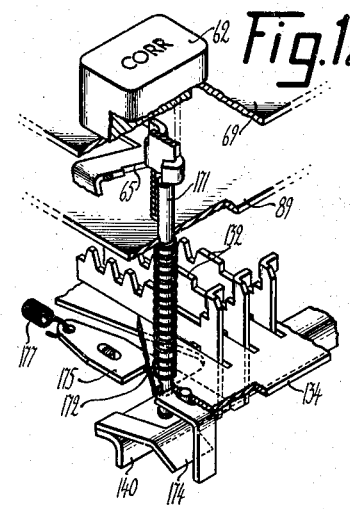
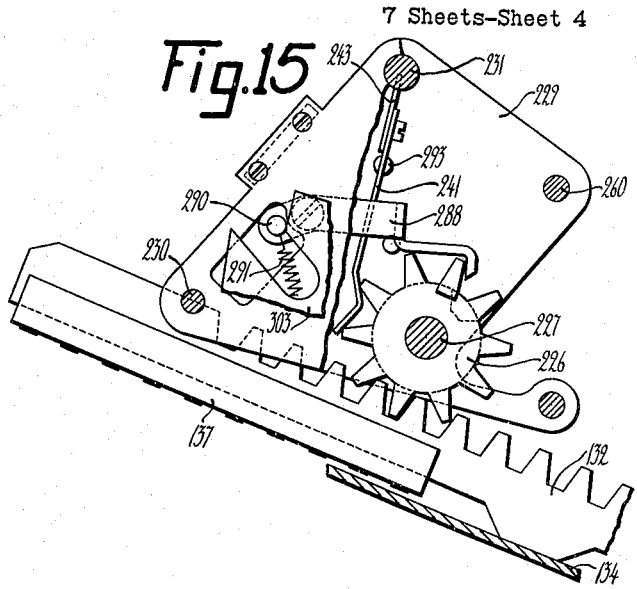
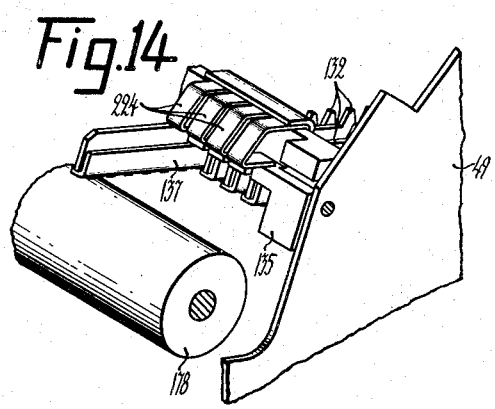
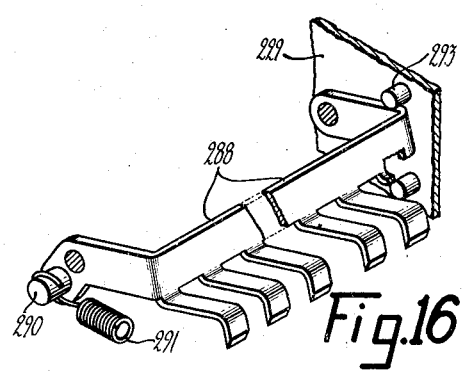
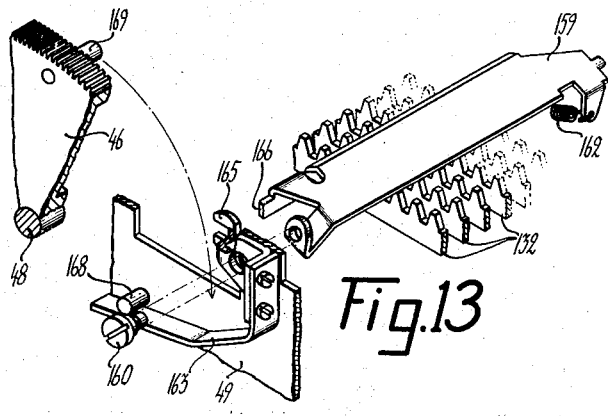
INVENTOR.
RICHARD W. PITMAN
BY
Jesse A. Holton
ATTORNEY

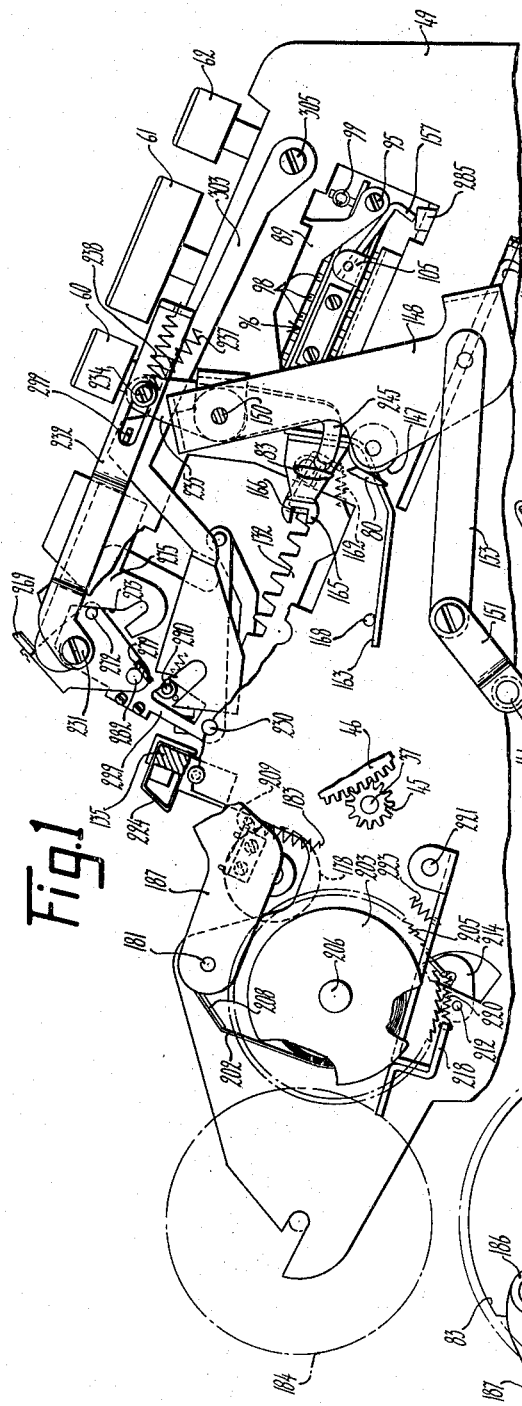

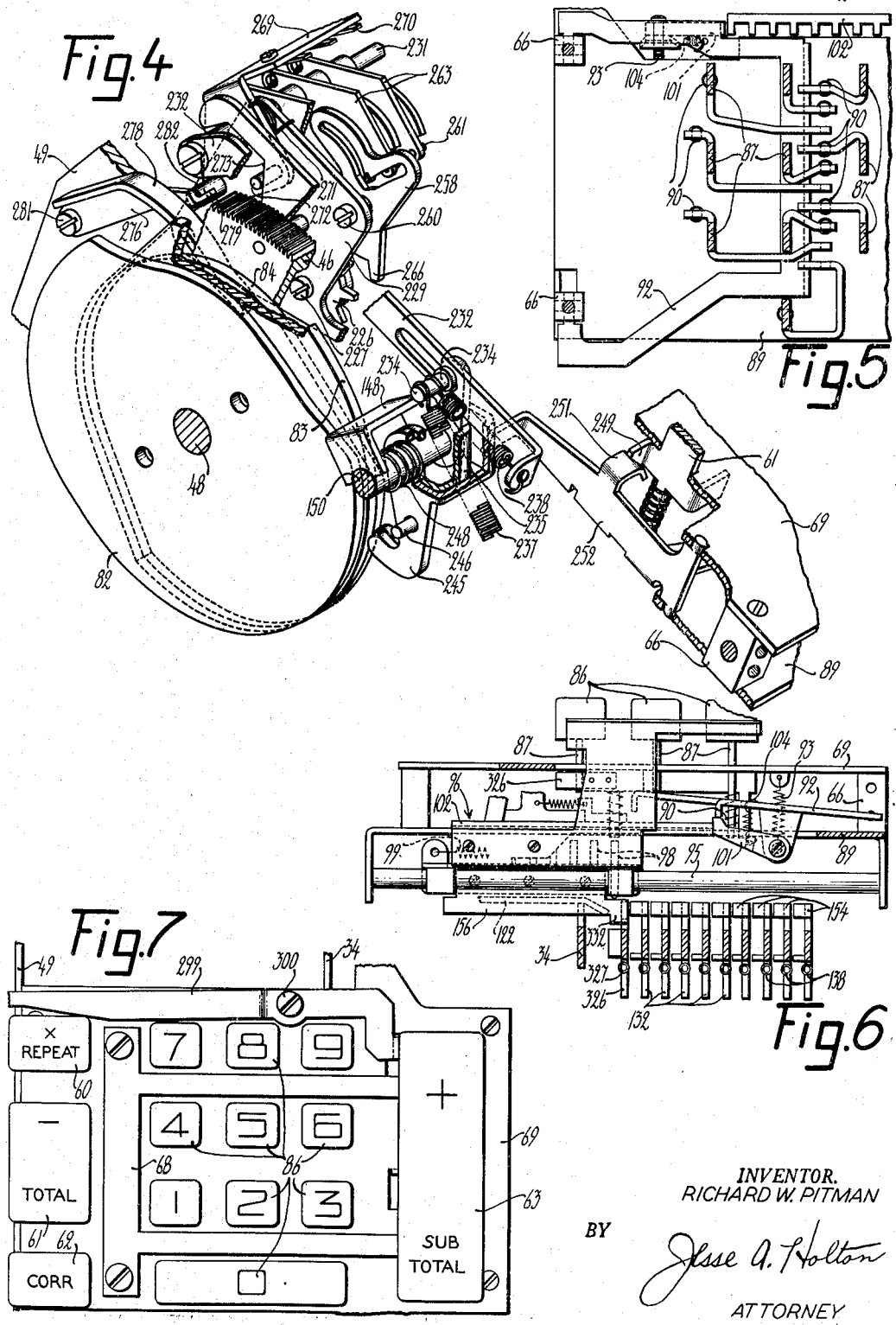

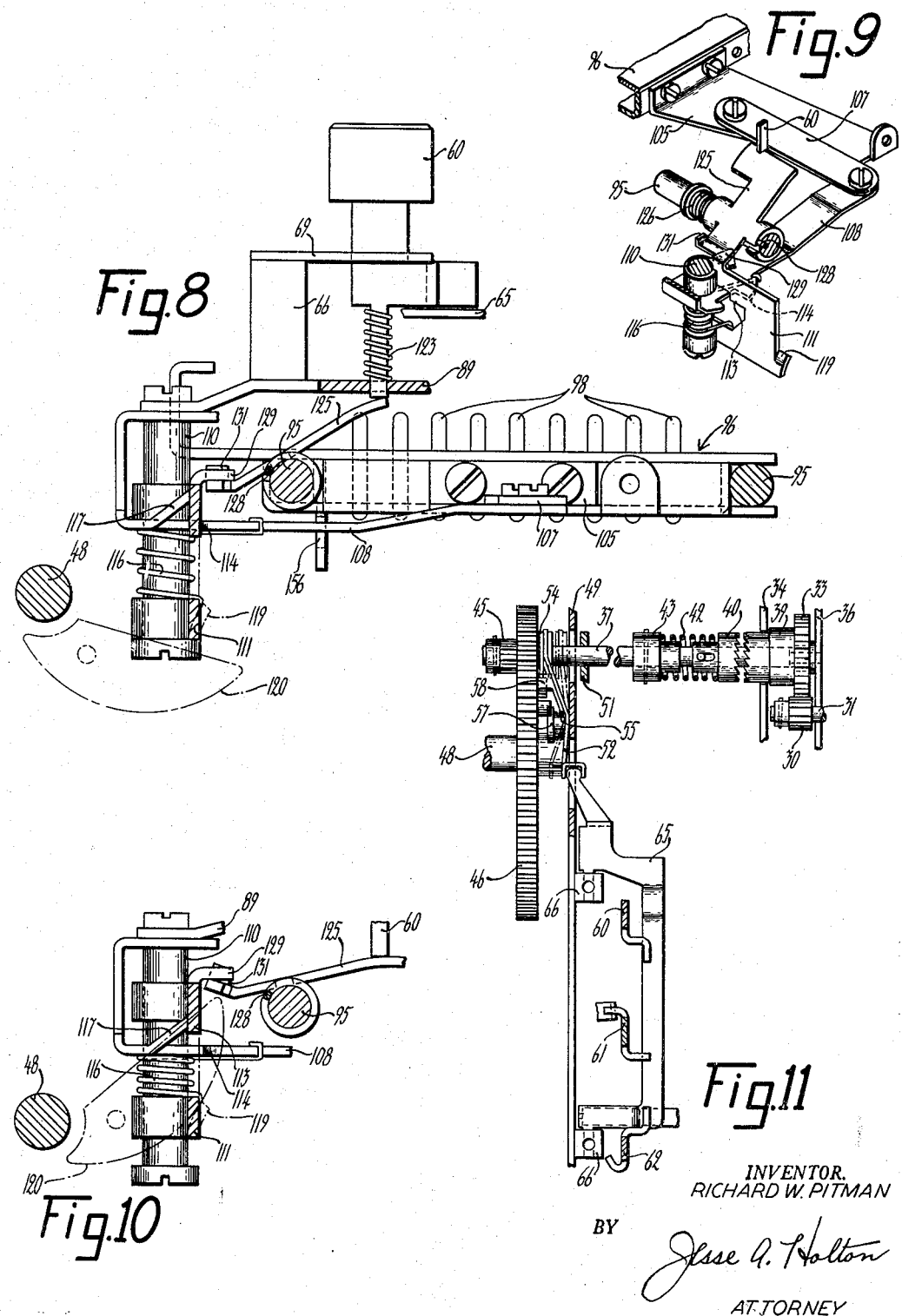

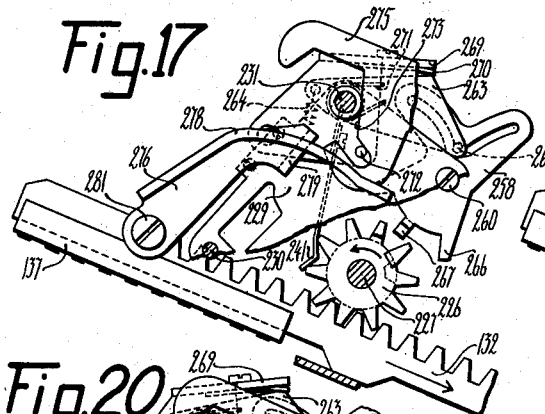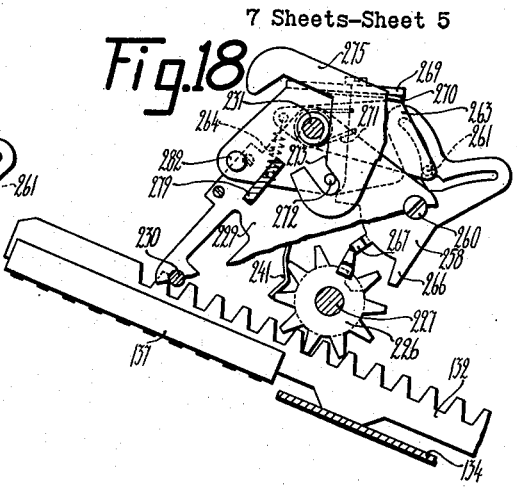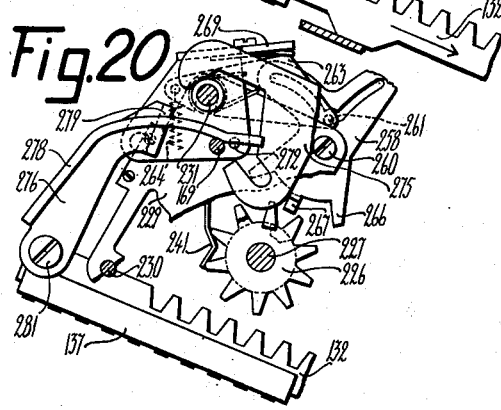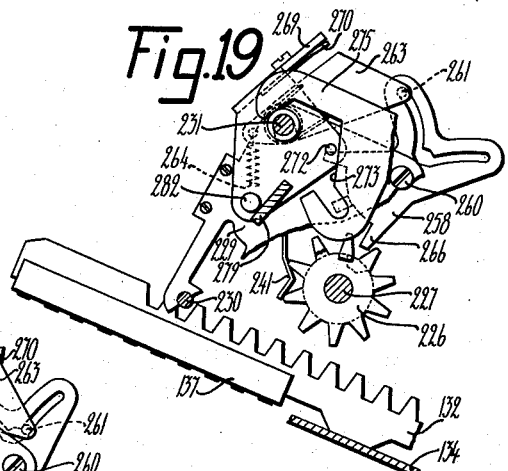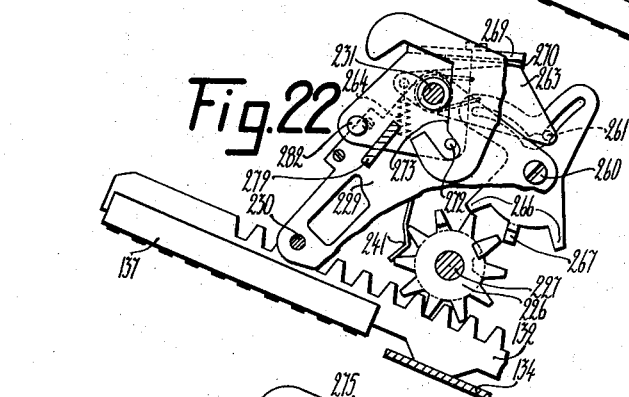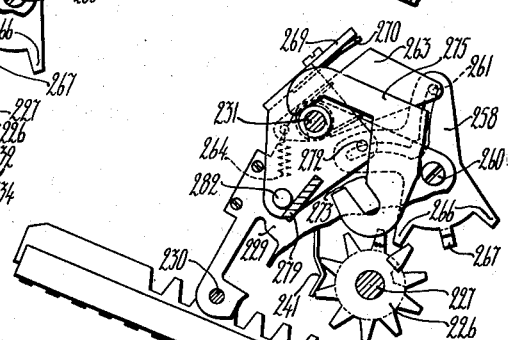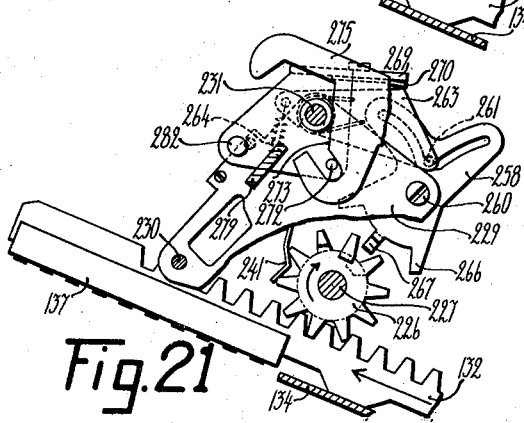

Sept. 19, 1961 R. W. PITMAN 3,000,561
TEN KEY ADDING AND SUBTRACTING MACHINE
Filed Dec. 12, 1955 7 Sheets-Sheet 6
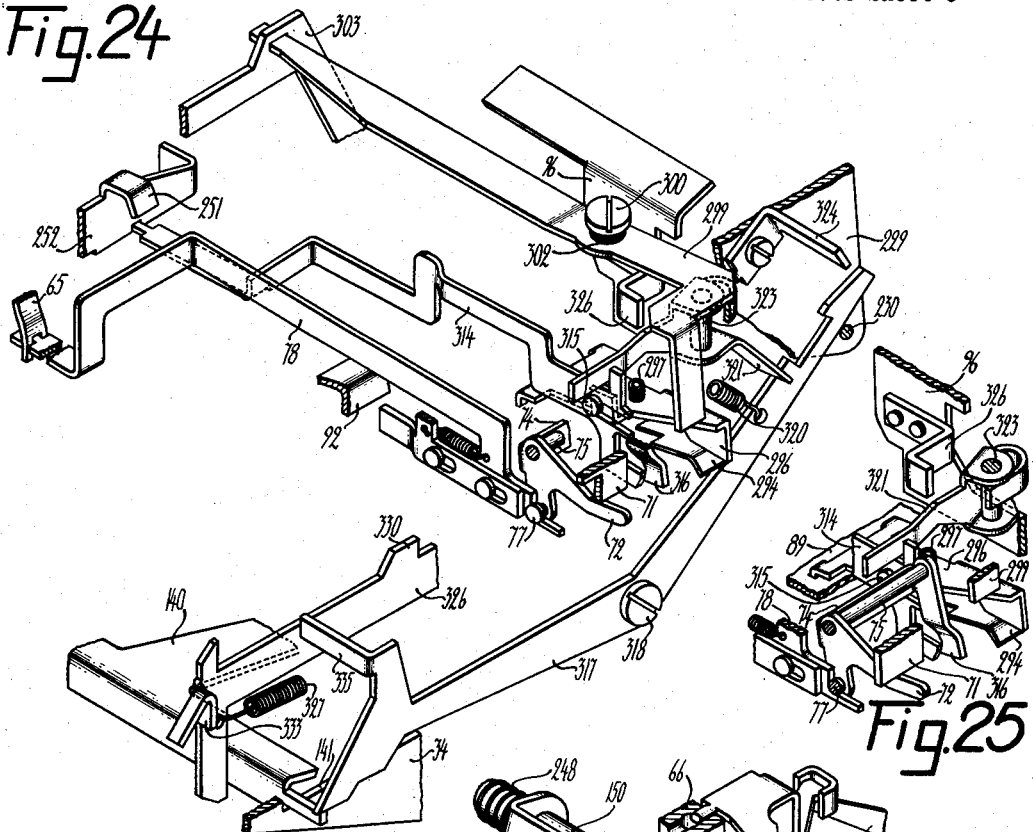
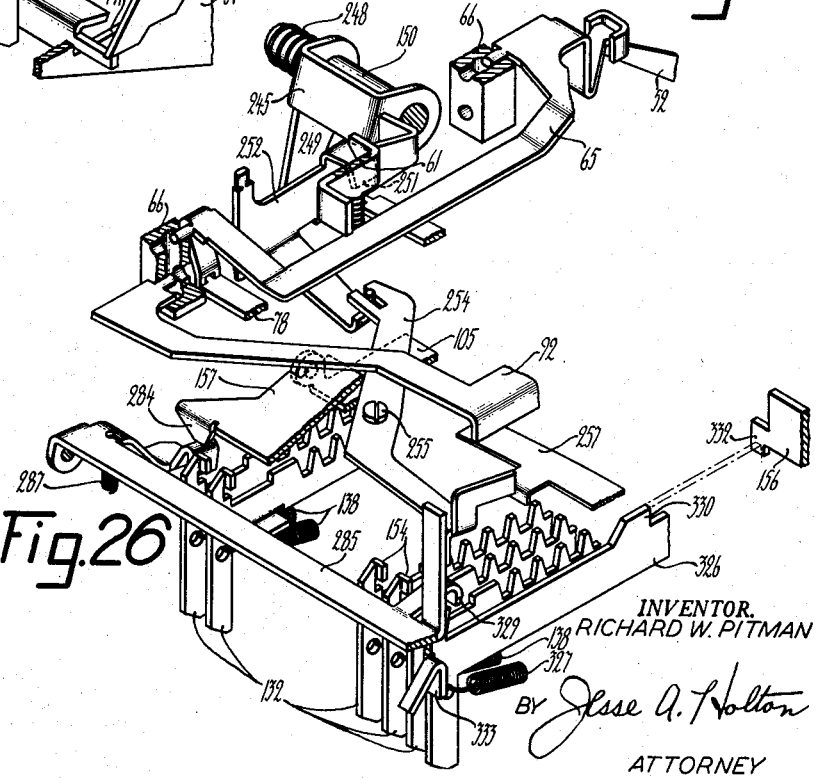
INVENTOR.
RICHARD W. PITMAN
BY Jesse A. Holton
ATTORNEY Sept. 19, 1961    R. W. PITMAN    3,000,561
TEN KEY ADDING AND SUBTRACTING MACHINE
Filed Dec. 12, 1955    7 Sheets-Sheet 7

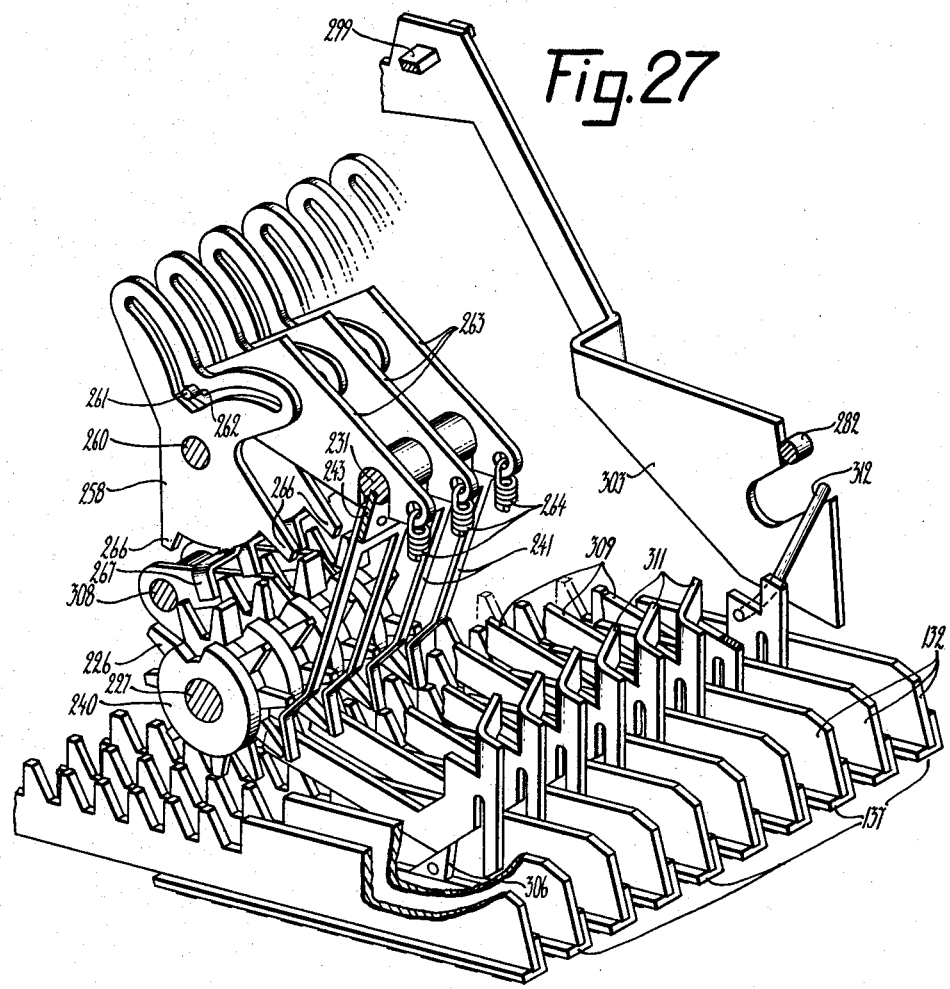

| CAM | 0 | 30 | 60 | 90 | 120 | 150 | 180 | 210 | 240 | 270 | 300 | 330 | 360 | 0 |
|---|---|---|---|---|---|---|---|---|---|---|---|---|---|---|
| TYPEBARS | 0 | | 9 POSITION | | | | | | | RESTORED | | | | |
| REGISTER ADD | | RACKS DISENGAGED | | | RACKS ENGAGED | | | | | | | | | |
| CARRYOVER ADD | | RESTORED | | | | CONDITIONING | | | CARRY POSITION | | RESTORED | | | |
| REGISTER SUBTRACTION TOTAL | | | RACKS ENGAGED | | | | RACKS DISENGAGED | | | | | | | |
| CARRYOVER SUBTRACTION | REST'D | | CONDITIONING | | | | CARRY POSITION | | | | RESTORED | | | |
| REGISTER SUB-TOTAL | | | RACKS ENGAGED | | | | | | | RACKS DISENGAGED | | | | |
| PRINTING | | | | | PRINTING POSITION | | | | | | | | | |

INVENTOR.
RICHARD W. PITMAN
BY Jesse A. Holton
ATTORNEY

United States Patent Office 3,000,561
Patented Sept. 19, 1961

3,000,561
TEN KEY ADDING AND SUBTRACTING MACHINE
Richard W. Pitman, Laverock-Hillcrest, Pa., assignor to Underwood Corporation, New York, N.Y., a corporation of Delaware
Filed Dec. 12, 1955, Ser. No. 552,508
5 Claims. (Cl. 235—137)

This invention relates to small size adding and subtracting machines, and more particularly to improvements in such machines designed to enable economical production of such machines from a minimum number of easily manufactured parts.

Ten key machines capable of addition and subtraction are well known and commercially available but are generally heavy, bulky, and expensive, particularly in the motor driven models. The embodiment of my invention as disclosed in this application is constructed of full size, not miniature, parts and is designed to be driven by an inexpensive A.C. motor of the shaded pole type. With motors of this type, the starting load must be low and the power required must be distributed throughout the machine cycle without the peak loads permissible with more expensive motors.

It is then an object of this invention to provide a lightweight adding-subtracting machine which may be motor driven and may be produced to sell at a price competitive with manually operated machines.

It is also an object of this invention to devise an adding and subtracting machine using a minimum number of different parts and easily operable.

It is a further object to provide in such a machine, a printing mechanism which will give a substantially uniform type impression irrespective of the number of type in printing position.

Still another object is to provide uniform printing in such a machine by providing each type member with an individual impression control so that the printing from each type member will be independent of that of the others.

A further object is to develop a tens-transfer mechanism for an accumulator which mechanism is operative to transfer additively or subtractively.

Another object of the invention is to provide a simple add-subtract transfer mechanism for an accumulator which transfer mechanism includes a very few parts and can be set during accumulation of an item to later effect a tens-transfer in an appropriate one of two directions.

A still further object is the provision of a simple total and sub-total control mechanism for a register.

An auxiliary object of the above is to provide a sub-total control mechanism which is controlled by the same motor key used for addition wherein the function to be initiated is determined by the presence or absence of an indexed item.

Other objects will be in part obvious and in part pointed out in the following description and shown in the appended drawings of a preferred embodiment of my invention.

In the drawings;
FIGURE 1 is a left side view of the machine,
FIGURE 2 is a section through the machine looking from the left,
FIGURE 3 is a detail view showing the main actuating cams which have been omitted from FIGURE 1,
FIGURE 4 is a perspective view showing the register engagement control cams,
FIGURE 5 is a top view showing the pin carriage escapement mechanism,
FIGURE 6 is a rear view of the escapement mechanism,
FIGURE 7 is a plan view of the machine keyboard,
FIGURE 8 is an enlarged left side view of the pin carriage restoring mechanism,
FIGURE 9 is a perspective view of the mechanism of FIGURE 8,
FIGURE 10 is a view of a portion of FIGURE 8 in the item repeat position,
FIGURE 11 is a plan view of the machine cycling controls,
FIGURE 12 is a perspective view of the item correction mechanism,
FIGURE 13 is a view in perspective of the type bar aligning means,
FIGURE 14 is a perspective showing of the type bar impression controlling device,
FIGURE 15 is a sectional view through the register looking to the right,
FIGURE 16 is a detailed perspective showing the total stop for the register wheels,
FIGURES 17 to 23 are left side views of the register wheels and transfer mechanism wherein,
FIGURE 17 shows the condition prior to a tens-transfer,
FIGURE 18 shows the setting of the transfer mechanism during addition,
FIGURE 19 shows the transfer mechanism after it has transferred in addition,
FIGURE 20 shows the transfer mechanism in restored position,
FIGURE 21 shows the transfer members prior to a subtractive transfer,
FIGURE 22 shows the same parts set and
FIGURE 23 shows the parts after the subtractive tens-transfer,
FIGURE 24 shows in perspective the keyboard parts for control of total and sub-total selection,
FIGURE 25 is a perspective detail view showing additional parts not visible in FIGURE 24.
FIGURE 26 is a perspective view of the rack bar release and total signal printing mechanism,
FIGURE 27 is a rear perspective view of the device to eliminate insignificant zeros in total printing and
FIGURE 28 is a timing chart showing the sequence of machine operations.

GENERAL DESCRIPTION

The present invention is embodied in a small lightweight adding machine of the ten key type having a movable pin carriage. The mechanism is driven by an A.C. motor of the shaded pole type which is clutchable to a nest of rotary cams for actuation of the machine elements. Amounts indexed in the pin carriage are effective to control the extent of movement of a set of reciprocating type bars which set, at a printing line, type corresponding to the indexed amount whereupon a movable platen presses a paper tape and inked ribbon against the set type to record the amount.

The type bars are formed with racks on their upper surfaces and the machine includes a set of register wheels mounted in a rocking frame for engagement with the type bar racks to enter the indexed amounts into the register. The frame also includes a set of tens-transfer members, one between each two register wheels, each member being settable whenever the register wheel on its right side passes from the 9 to the 0 position or vice versa. After the register wheels are disengaged from the type bar racks, the set transfer member are actuated to move the register wheel on its other side for an additional step of movement in the same direction as the transfer member was set by its right hand register wheel.

The machine is also operable to print the total or sub-total of the indexed amounts by releasing all of the type bars to rotate the engaged register wheels in a subtractive direction until the wheels arrive at their 0 position and arrest movement of the racks. The register may be disengaged while the wheels are in a 0 position if a total is printed or may be left in engagement with the racks to reenter the printed total if a sub-total is to be printed.

DETAILED DESCRIPTION

Driving mechanism (FIGS. 1, 3, 11, 24 AND 26)

The machine described herein is driven by a pinion gear 30, FIGURE 11 mounted on a shaft 31 which may be the shaft of a light duty motor as stated above. A driven gear 33 meshes with gear 30 and is freely rotatable between the machine side wall 34 and an auxiliary bearing plate 36 which journals the end of a shaft 37 supporting gear 33. The inner, left, end of hub 39 of gear 33 is formed with a ring of ratchet teeth to act as the driving part of a machine clutch. Slidably, but not rotatably, mounted on shaft 37 is a toothed collar 40 forming the driven clutch part. A spring 42 between collar 40 and a second collar 43 fixed to shaft 37 normally holds collar 40 at its rightmost position on shaft 37. A wide pinion 45 secured to the left end of shaft 37 meshes with a large gear 46 rotatable on a post 48 in the left side wall 49.

Shaft 37 is shiftable to the right in its left bearing 51 and in bearing plate 36 to engage the clutch parts 39 and 40 and thereby cause rotation of gear 46. The shaft 37 is shifted to the right by a bent plate 52 pivoted at its bend on the left side wall and having its rear end engaged in a groove of a third collar 54 on shaft 37. The forward end of plate 52 is bent to a U shape and is normally held flat against the left side wall 49 with the U-shaped part projecting through the wall by a compression spring 55 on a stud 57 passing through plate 52. Plate 52 may be held in an operated position to hold clutch parts 39 and 40 engaged during a rotation of gear 46 by a projection 58 on plate 52 which projection is normally engaged in a notch in the right side of gear 46 but will hold plate 52 in its clutch engaging position during a revolution of gear 46 by its engagement with the unnotched side of gear 46.

Plate 52 may be shifted clockwise in FIGURE 11 by the depression of any one of four keys, the repeat key 60, FIGURES 1 and 7, the subtract-total key 61, the correction key 62, and the sub-total-addition key 63. Each of these keys will, when depressed rock a plate 65, FIGURE 11, about its pivot in bearings 66 on left side wall 49, and plate 65 will by its rear depending arm which is engaged in the U shaped end of plate 52, see also FIGURE 26, rock plate 52 to clutch engaging position. Each of the keys 60, 61, and 62 is formed with a projection resting above plate 65 to rock the plate as the key is depressed. Key 63, however, is mounted on arms of a spring plate 68, FIGURE 7, secured to the top plate 69 of the keyboard and has a key stem 71 projecting downwardly into engagement with an arm 72, see FIGURES 24 and 25, of a cradle 74 pivoted on a fixed rod 75. A stud 77 fixed in a lower arm of cradle 74 is to the right of a shoulder of a slide 78 which slide 78 has a reduced portion at its left end, see FIGURES 24 and 26. A depending of plate 65 is slotted at its lower end and embraces the reduced portion of slide 78 so that the depression of key 63 acts through cradle 74 and slide 78 to rock plate 65 in the same manner as the plate is rocked by keys 60, 61, and 62. It will thus be seen that depression of any of the four keys, 60, 61, 62, or 63 will cause the clutch 39, 40 to be engaged to drive gear 46 and the clutch will remain engaged until gear 46 has completed its full cycle.

Rotatable on post 48 and secured to the left side of gear 46 are a group of 5 actuating cams to operate the different machine sections. From the left side inwardly, these cams are the type bar cam 80, FIGURE 3, which controls movement of the type bars of the machine, the platen cam 81 which moves the platen against the set type bars, the total cam 82 to engage the register in total taking cycles, the add cam 83 to engage the register in additive timing, and the pressure relief cam 84 which holds the cam follower off of the add cam while the machine is not cycling to permit a free shift of the cam follower to the total cam as will be later described. Cams 80 to 83, inclusive, operate the associated cam followers with the timing shown in FIGURE 28 as will be further set out in the description of the associated mechanisms.

Keyboard and indexing mechanism (FIGS. 2 AND 5 TO 7 INCLUSIVE)

Amounts to be printed and entered into the accumulator are set up by a group of ten digit keys 86 shown in FIGURE 7. Each digit key 86 is mounted on a key stem 87 slidable in an upper keyboard plate 69 and a lower keyboard plate 89. All key stems 87 have at least one lower extension passing through lower plate 89 in a line from front to rear and are each urged upwardly by individual springs 90. Alongside the line of holes in plate 89 under a projecting part of each key stem 87 is an escapement bail 92 pivoted in the bearings 66 and urged upwardly by a spring 93, FIGURE 6, between bail 92 and top plate 69. Escapement bail 92 will be rocked counterclockwise in FIGURE 6 by any numeral key 86 as the key is depressed.

Horizontally slidable under lower plate 89 on rods 95 fixed in downwardly extending sides of plate 89, is a pin carriage 96 having a number of rows of settable pins 98, each row having 9 pins frictionally held in any position. The pin carriage 96 is urged to the left by a spring 99 between it and an extension of the left side plate 49 but will normally be retained against leftward movement by the engagement of a loose dog 101, FIGURE 6, on escapement bail 92 with a notched rack 102 on pin carriage 96, see also FIGURE 5. Loose dog 101 is urged upwardly against a turned down ear of escapement bail 92 by a spring 104 between the dog 101 and bail 92. When a digit key 86 is depressed, the projection passing through lower plate 89, depresses the aligned one of the pins 98 in pin carriage 96 and simultaneously depresses escapement bail 92 to move the loose dog 101 below rack 102. Spring 99 then moves the pin carriage 96 slightly to the left, right in FIGURE 6, to abut the turned down ear on bail 92. When the key 86 and bail 92 are released and move upwardly, dog 101 strikes against the bottom of a tooth on rack 102 which retains dog 101 against upward movement until the ear of bail 92 moves above the rack 102, whereupon spring 99 pulls pin carriage 96 and rack 102 to the left of the machine and dog 101 moves into the next notch of rack 102 to stop the pin carriage 96 after a one step advance.

Restoration of the pin carriage and item repeat (FIGS. 8, 9, AND 10)

After an item which has been set in the pins 98 of pin carriage 96 has been printed and accumulated, it is desirable to return carriage 96 to a home position and to reset any pins 98 in preparation for indexing of a new amount. Referring to FIGURE 9, a bracket 105 is secured to the left side of pin carriage 96 and is connected by a link 107 to an arm 108 pivoted on a post 110 fixed in the lower keyboard plate 89, see FIGURE 8. Also pivoted on post 110 and vertically slidable thereon is a by-pass plate 111 having two arms embracing the post 110 above and below arm 108. The upper arm of plate 111 has, FIGURE 9, a shoulder 113, which, in the lower position of plate 111, is aligned with an ear 114 on arm 108. A spring 116 about post 110 between the arms of plate 111 is compressed between arm 108 and the lower arm of plate 111. Spring 116 acts as a compression spring to urge plate 111 to its lower position and at the same time is a torsion spring to urge plate 111 clockwise in FIGURE 9 against a stop ear 117, FIGURES 8 and 10, bent up from arm 108. During leftward movement of pin carriage 96 as described above, arm 108 and plate 111 rotate clockwise from their FIGURE 9 positions and position a tab 119 on the outer end of plate 111 farther to the rear of the machine. Near the end of a machine cycle (a rotation of gear 46) a cam 120, secured in a recess in the right side of gear 46 and having a normal position as shown in FIGURE 8, strikes tab 119 of plate 111 and then rotates plate 111 and arm 108 counterclockwise in FIGURE 9 to their original position. During this movement of arm 108, pin carriage 96 is moved back to and through its normal right hand position with rack 102 ratcheting over dog 101. When cam 120 leaves tab 119, the parts are released to the urge of the pin carriage spring 99, FIGURE 6 and move leftward to bring the first tooth of rack 102 against dog 101 to arrest the pin carriage 96 in its normal position. During such return movement of pin carriage 96, any set pins 98 are returned to their upper position by their engagement with a cam plate 122, FIGURES 2 and 6, fixed to the right side wall 34.

When it is desired to retain the amount indexed on pins 98 for several cycles, the repeat key 60 may be used to prevent restoration of the pin carriage 96 during a cycle of gear 46. The repeat key 60, see FIGURE 8, is slidable in the keyboard plates 69 and 89 and is retained in its upper position by a spring 123. The lower extension of key 60 passes through keyboard plate 89 into engagement with a plate lever 125 rotatable and slidable on the rear pin carriage rod 95. A spring 126, FIGURE 9, between a collar on rod 95 and lever 125 urges the lever to the left to hold its left side against a pin 128 in the left side wall 49. The rear end of lever 125 rests under a forwardly extending ear 129 on the upper arm of plate 111 and when lever 125 is rocked by depression of key 60, plate 111 is raised on post 110 to the FIGURE 10 position wherein its shoulder 113 lies above the ear 114 on arm 108. When lever 125 is rocked to its operated position, a slot in its left side is aligned with pin 128 and spring 126 moves lever 125 to the left to hold lever 125 in its operated position when key 60 is freed to return to its upper position.

During the machine cycle initiated by operation of key 60 as described above, cam 120 on gear 46 engages plate 111 to swing it counterclockwise as has been set out but as shoulder 113 of plate 111 is above ear 114 on arm 108, arm 108 is not moved and pin carriage 96 will remain in its indexed position. Near the end of its movement by cam 120, the ear 129 of plate 111 will engage an ear 131 on lever 125 and shift lever 125 to the right out of engagement with pin 128 and if key 60 is released at this time, spring 116 will restore plate 111 and lever 125 to their FIGURE 8 position as soon as the cam 120 passes by plate 111, thus preparing the pin carriage restoring mechanism for operation on the next following machine cycle.

*Differential mechanism*

(FIGS. 1, 2, 6, 12, 13 AND 14)

Beneath the pin carriage and extending rearwardly therefrom are a plurality of numeral type bars 132 slidable on a guide plate 134 between the side walls 34 and 49. The forward end of each type bar 132 is formed with a depending tail which passes through slots in plate 134 to guide the bars 132 and the rear ends of bars 132 pass through guide slots in a bar 135. Each bar 132 is notched to form a gear rack on its upper edge and each carries a type block 137 on its lower rear end. A spring 138 between the lower tail of each type bar 135 and the rear end of plate 134 urges the bars rearwardly to hold their lower tails against a universal bar 140, FIGURE 2. The universal bar 140 is guided for movement parallel to the movement of type bars 132 by the engagement of the outer ends of bar 140 in slots 141 in the side walls 34 and 49 while a center rearward extension of the bar 140 is connected to an arm 142 fixed to a shaft 144 pivoted in the side walls 34 and 49 and urged counterclockwise by a spring 145 connected to arm 142. The universal bar 140 is moved rearwardly and then forwardly during a cycle of gear 46 by a cam 80 fixed to gear 46. As will be seen in FIGURE 1, a cam roller 147 on an arm 148 pivoted on a stud 150 in side wall 49 is urged against the cam 80 by spring 145, FIGURE 2 through shaft 144, arm 151 on shaft 144 and link 153 connecting arms 148 and 151. The motion of universal bar 140 under control of cam 80 through the above linkage is diagrammatically shown in the first line of FIGURE 28 wherein it will be seen that type bars 132 are first released enough to bring the 0 type of block 137 to a printing line and are then after a short delay released for movement to their rearmost positions. During the second half revolution of gear 46, bar 140 is driven to return the type bars 132 first to their 0 positions and then after a short dwell to their normal forward positions.

The rearward excursion of type bars 132 may be individually limited to position selected type at the printing line. As will be clear from FIGURES 2 and 6, when any pin 98 is set by operation of a key 86 and pin carriage 96 escaped to the left, each set pin 98 will be in the path of movement of one of the tails 154 extending upwardly from the front end of a type bar 132 and the bar 132 will be arrested when block 137 is positioned with a type corresponding to the value of the set pin 98 at the printing line. It will be noticed that there are no pins corresponding to a 9 position of the type bar 32 for, as no type bar is to ever move past this position, a permanent 9 stop plate 156 is fixed to the rear end of the pin carriage to stop at the 9 position any type bars for which no pin 98 has been set.

Inasmuch as key 86 may not be depressed for each type bar 132, there may be some bars 132 at the left side which would not be arrested by pin carriage 96 as thus far described. To prevent movement of such bars 132, pin carriage 96 carries at its left side, a stop plate 157, FIGURES 2 and 26, pivotally mounted in bracket 105, FIGURES 1 and 9. This stop plate 157 is normally in the path of movement of the tails 154 of bars 132 and will stop the bars 132 before they move to a printing position. The stop plate moves with pin carriage 96 so that as each key is depressed, stop plate 157 moves to release one type bar for control by the pin 98 or the 9 stop 156 of pin carriage 96.

To improve the appearance of the printing of type bars 132 and to enable more accurate engagement of the register with the rack on bar 132, it is desirable to accurately align the bars 132 prior to the printing therefrom. For this alignment, an aligner 159, FIGURES 2 and 13 is pivoted at its forward edge in the right side wall 34 and on a stud 160 in the left side wall 49 to be normally held with its rear edge above type bars 132 by a spring 162. Also pivoted on stud 160 and outside of side wall 49 is an aligner actuating lever 163 having a slotted arm 165 passing through side wall 49 and embracing a projection 166 of aligner 159. A stud 168 in side wall 49 engages the rear arm of lever 163 to limit clockwise movement thereof by spring 162 to set the normal position of aligner 159. After racks 132 have advanced to their printing positions and before printing therefrom, the rear arm of lever 163 is struck by a stud 169 fixed in gear 46 to rock aligner 159 counterclockwise into engagement with the rack of each type bar 132 to hold them in an aligned position. After stud 169 passes by the end of lever 163, spring 162 restores the aligner 159 and lever 163 to their normal positions.

When an amount has been indexed incorrectly in pins 98 and it is desired to remove this set up amount without printing or accumulating it, the correction key 62 is depressed. The correction key 62 will, as pointed out above, operate bail 65 to initiate a cycle of gear 46 which restores pin carriage 96 to its right-hand home position. During such a correction cycle, the universal bar 140 is held to prevent movement of racks 132 and thereby prevent printing of the erroneous amount. As shown in FIGURE 12, the stem of key 62 overlies a plunger 171 slidable in plates 89 and 134 and urged upwardly by a spring 172. The lower end of plunger 171 is projectable by key 62 into the path of movement of a bracket 174 fixed to universal bar 140 and will prevent movement of bar 140 during a machine cycle in which key 62 is depressed, thus preventing movement of bars 132 to printing positions. Plunger 171 is held in its depressed position to hold bar 140 during the machine cycle by a plate 175 slidable on the lower surface of guide plate 134. Plate 175 is urged rearwardly by a spring 177 and will be held free of plunger 171 while the machine is at rest by the engagement of bracket 174 with a depending tail on the forward end of plate 175. The movement of bar 140 into engagement with plunger 171 is sufficient to release plate 175 for movement into frictional engagement with plunger 171 to hold it in depressed position until the end of the cycle of gear 46 at which time the full restoration of bar 140 moves plates 175 free of plunger 171.

*Printing mechanism*
(FIGS. 1–3 AND 14)

Printing of an indexed amount is done by pressing a platen carrying a paper tape and an inked ribbon against the type on block 137 of bars 132 after the bars 132 have moved into their positions against the pin carriage stops 98 and 156. A platen 178, FIGURE 2, is pivotally mounted in two arms 180 secured to a shaft 181 which is rotatable in side walls 34 and 49 and is urged clockwise in FIGURE 2 by a spring 183, FIGURE 1. The platen 178 is raised to press a paper tape 184 passing around the platen against such type bars 132 as have moved to printing position, by gear 46 through a cam 81, FIGURE 3, which actuates a cam follower 186 rotatable on an arm 187 fixed to shaft 181, see also FIGURE 1. The printing motion given to platen 178 by cam 81 is shown in the last line of the timing diagram, FIGURE 28, wherein it may be seen that the platen 178 is moved during the time that type bars 132 are stationary in their indexed positions.

The paper tape 184 is guided about the platen 178 by a pressure plate 189, FIGURE 2 secured between the arms 180 and resiliently bearing against the surface of platen 178. Pressure rolls 190 are yielding held against the bottom of platen 178 by a leaf spring 192 fixed to a bar 193 secured in arms 180 and hold the paper tape 184 for feeding with the platen 178. After the paper tape 184 leaves the top of the platen 178 it is guided between a paper table 195 and a tear plate 196, both secured to a squared center section of shaft 181.

The platen 178 is rotated one step counterclockwise at each movement to printing position by a pawl and ratchet device. As shown in FIGURE 2, the platen 178 has secured thereto outside of the right arm 180, a ratchet wheel 198. Pivoted on the outside of side wall 34 is a pawl 199 urged counterclockwise by a spring 200 to hold its upper end against the ratchet 198. As the platen 178 is moved upwardly to print, ratchet wheel 198 moves idly by pawl 199 which will drop into the next lower tooth of the ratchet 198. On the return movement of platen 178, pawl 199 holds the tooth of ratchet 198 and thus causes a rotation of platen 178 to feed the paper tape 184 one step to move the printed amount from the printing position.

An inked ribbon 202, FIGURE 1, is passed along the upper surface of platen 178 between the paper tape 184 and the type bars 132 to provide the ink for recording on tape 184. The ribbon 202 is passed between two spools 203, each secured to a ratchet wheel 205 freely rotatable on a post 206 secured in arms 180 and passing through a hole in the machine side wall 34 or 49, one spool 203 and ratchet wheel 205 being outside of each of the side walls 34 and 49 of the machine. From the rear of spool 203 on the left side of the machine, FIGURE 1, the ribbon 202 first passes over a light tensioning spring 208 on shaft 181, then over shaft 181 to a ribbon guide 209 fixed to the left arm 180. The ribbon 202 passes from guide 209 across the top of the platen 178 to a similar guide 211, FIGURE 2, fixed to the right arm 180 and thence to the front of the spool 203 on that arm.

The printing motion of platen 178 is utilized to move the ribbon 202 across the top of platen 178 to provide a different portion of the ribbon 202 for each printing impression. Pivoted in the machine side walls 34 and 49 below the ratchets 205 is a shaft 212 carrying two pawl arms 214 and 215 on the left and right ends, respectively. Each pawl arm is secured to the shaft 212 inside the adjacent side wall and is formed with an ear projecting through a slot in the side wall for engagement with one of the ratchet wheels 205. Pawl arm 215, FIGURE 2, extends rearwardly from shaft 212 with a spring 217 connected between it and side wall 34 to urge shaft 212 clockwise. Pawl arm 214, FIGURE 1, extends forwardly from shaft 212 and is connected to an arm 218 by a spring 220. Arm 218 is pivoted on a stud 221 in side wall 49 and is urged clockwise by a spring 223 into engagement with the ribbon on the left side ribbon spool 203. It may be noted that as shown pawl arm 214 is in engagement with its ratchet 205 and therefore as the ribbon spool and ratchet 205 are moved rearwardly by arm 180 during return of platen 178 from printing position, the ribbon spool 203 will be rotated to take up ribbon on spool 203. As the ribbon 202 is built up on spool 203, arm 218 will be moved more and counterclockwise until the axis of spring 220 moves below the center of shaft 212 whereupon shaft 212 will be swung clockwise to place pawl arm 215 in engagement with its ratchet 205. This will result in the right hand spool 203 being rotated on the forward movement of ratchet 205 to wind up ribbon 202 on that spool 203. Ribbon 202 will be wound up on the right hand spool 203 until the arm 218, FIGURE 1, has moved clockwise sufficiently to again bring the axis of spring 220 far enough above the center of shaft 212 to overcome the urge of spring 217 whereupon shaft 212 will be rocked back to the position shown and the left spool 203 will again be driven as before.

For the best printing impression on paper tape 184, the printing pressure of each type bar 132 against the tape 184 should not vary as the number of bars 132 to be printed from is changed. This requirement is satisfied if the printing pressure of each type bar is independent of that of the others as distinguished from the conventional type wherein the printing pressure is supplied by the platen and is exerted against all of the indexed type bars irrespective of their number. In the present disclosure, the type bar guide bar 135, FIGURES 1, 2 and 14 is deeply slotted to permit movement of the rear ends of bars 132 with platen 178. Secured to bar 135 is a leaf spring 224 slotted to provide a spring finger for each type bar 132. The fingers of spring 224 are bent into substantially a V shape and are positioned with their free ends resting on a ledge of bar 135 and just above the top surfaces of bars 132. After the bars 132 are moved to printing positions, platen 178 is raised as above set out into engagement with type blocks 137 of bars 132. The type bars 132 are raised by the platen 178 into engagement with the fingers of spring 224 which during the further movement of platen 178 exert an individual printing pressure on the bars 132. As the printing pressure depends only on the movement of platen 178 and not on the force driving the platen, the individual printing pressure does not vary with the number of indexed type bars 132 and remains uniform under all conditions.

*Register mechanism*
(FIGS. 1, 2, 4, 15, AND 27)

The register provided for accumulating the amounts indexed by keys 86 is primarily a set of toothed gear wheels 226 rotatable on a shaft 227 secured in a register frame 229 pivotally mounted on studs 230 in the side walls 34 and 49. Pivotally connected to the left end of a rod 231 passing through frame 229 is a link 232, FIGURES 1 and 4, slotted near its forward end to receive a stud 234 in a cam follower lever 235 pivoted on stud 150. A spring 237 urges lever 235 clockwise to hold its lower arm against the cam 83 previously described. A second spring 238 connected between the forward end of link 232 and stud 234 serves to hold the link with the forward end of its slot against stud 234. In the normal, arrested, machine condition, cam 83 acting through lever 235, link 232 and the register frame 229, holds the register wheels 226 out of engagement with the racks formed in the upper edges of type bars 132 as shown in FIGURE 2.

Each register wheel 226, as best shown in FIGURE 27, is made with a desired number of teeth, a multiple of ten for the decimal system, and has a notched hub 240 secured to the right side thereof. At least one of the teeth of wheel 226 is thicker than the others and extends leftward to define a 0 position of the wheel 226. The wheels 226 are spaced apart on shaft 227, preferably by washers, to be vertically aligned with the rack teeth of type bars 132 and are retained in the digit representing positions to which they may be set, by fingers of a leaf spring 241 fixed to a plate 243 held in a slot in rod 231, the lower ends of the fingers of leaf spring 241 each engaging between a pair of teeth of a wheel 226 to detent the wheel in any digit representing position.

*Additive entry into register*

(FIGS. 1–4 AND 15)

When the amount indexed in pin carriage 96 is to be entered additively into the register wheels 226, it is only necessary to operate the add key 63 to initiate a cycle of gear 46 as above described, for the machine is normally in condition to additively enter an indexed amount. An entry is considered to be added when the register wheels 226 are differentially rotated counterclockwise in FIGURE 2. Such differential rotation of the wheels 226 is accomplished by moving wheels 226 into engagement with the racks of type bars 132 while the bars are at their rearward printing positions and retaining the wheels engaged until the type bars 132 are restored to their 0 printing position. Such engagement of the register wheels 226 is controlled by cam 83, FIGURES 3 and 4, and the follower 245, FIGURE 4, for the cam. Cam follower 245 is rotatable and slidable on stud 150, having two arms through which stud 150 passes and which are on opposite sides of cam lever 235. Cam lever 235 is connected to follower 245 by a pin 246 on lever 235 which pin passes through a hole in follower 245. When lever 235 is engaged by its cam 84, it is rocked sufficiently to retain the nose of follower 245 out of engagement with its cam 83. A spring 248 around stud 150 urges follower 245 to the right into alignment with cam 83 and holds the right arm of follower 245 against the left side wall 49.

Shortly after gear 46 starts to rotate in an adding cycle initiated by key 63, cam 84 releases cam lever 235 to allow spring 237 to move cam follower 245 against the aligned cam 83 which holds the above parts in the normal position until the type bars 132 have been aligned in their printing positions as above set out. Then, as shown by the second line "Register Add" of FIGURE 28, follower 245 is released by cam 83 and spring 237 rocks lever 235, link 232 and register frame 229 to the FIGURE 15 position wherein the register wheels 226 are engaged in the rack teeth of type bar 132. Wheels 226 will be retained in this position to be rotated by the type bars 132 until all advanced type bars 132 have been restored to their 0 positions. Thus, in an adding cycle, each register wheel will be rotated counterclockwise, FIGURE 2, an extent proportional to the digit printed by the associated type bar 132.

*Subtractive entry into register*

(FIGS. 1–4, 15 AND 26)

A subtractive entry into register wheels 226 is substantially the same as an additive entry described above with the exception that the register wheels 226 are rotated clockwise during subtraction and the timing of register engagement is altered. For initiating a subtractive entry, the key 61, FIGURE 7, is depressed to rock the bail 65 and start a cycle of gear 46. A cam surface 249, FIGURE 4, on key 61 will, during depression of key 61, engage an ear 251 on an arm 252 pivoted in keyboard plates 69 and 89 to rock arm 252 counterclockwise. The rear end of arm 252 projects through a hole in left side wall 49 into engagement with follower 245, see FIGURE 26, and will, as key 61 is depressed, shift follower 245 leftward into alignment with a cam 82, FIGURE 4. Arms 252 and follower 245 will be held in this position by a lock lever 254, FIGURE 26, having a slotted end engaging a rightward extension of arm 252 and pivoted on a screw 255 in keyboard plate 89. A leaf spring 257 also secured to plate 89 is normally held down by the right end of lever 254 but when lever 254 is swung clockwise as arm 252 is moved, spring 257 will move upwardly behind the right end of lever 254 to hold lever 254, arm 252, and follower 245 in their set positions. The left end of spring 257 lies under the escapement bail 92 so that operation of any digit key 86 will depress bail to release spring 257 from lever 254.

With follower 245 in alignment with cam 82, the register wheels 226 will be moved into engagement with the racks of type bars 132 as soon as the type bars which are free of the stop plate 157, FIGURES 2 and 26, have moved to their 0 printing position and during the dwell period as indicated in the fourth line, "Register Subtraction—Total" of FIGURE 28, since cam 82 is cut away at this point. The register wheels 226 will be rotated clockwise by the type bars during their further rearward movement to printing positions to subtract from each wheel 226 the amount printed by its associated type bar 132. After type bars 132 have reached their rearmost position and are aligned by aligner 159, the register wheels are disengaged from bars 132 by the engagement of the rise of cam 82 with follower 245 and cam 82 holds the register frame in the normal position until cam 84 engages its cam follower arm 235 to lift follower 245 from cam 82. Thus during the first part of the cycle of gear 46, the register wheels will each be rotated clockwise by an amount equal to the digit printed by its corresponding type bar 132.

*Tens carry mechanism*

(FIGS. 2, 4, 15, 17 TO 23 AND 27)

Whenever any register wheel 226 passes from a 9 representing position to a 0 position during addition or from 0 to 9 during subtraction, the next wheel 226 to the left should be moved one step in the corresponding direction to represent a transfer, additively or subtractively, of ten, respectively from or to the lower wheel 226. A simple tens transfer mechanism to operate the next higher wheel one tooth space under control of the lower wheel and in the same direction of rotation as the lower wheel 226, is provided in the register wheel frame 229. As best shown in FIGURE 27, the transfer mechanism comprises a plurality of transfer arms 258, one aligned with each register wheel 226 except the right hand one. The arms 258 are pivoted on a shaft 260 in register frame 229 and are held in their normal positions by the engagement of a pin 261 in a detent notch 262 of arm 258. Pins 261 are each secured in the forward ends of levers 263 pivoted on rod 231 and tensioned clockwise, FIGURE 27, by spring 264 to hold pins 261 into notches 262. The lower end of each arm 258 is formed with two teeth 266, one on each side of the teeth of the aligned register wheel and normally out of the path of the register wheel teeth. A tooth 267 on each arm 258 extends to the right between the teeth 266 into the path of the thick tooth of the register wheel 226 to its right. The detent notch 262 of each arm 258 is formed in the upper edge of the point of a V shaped slot in arm 258 and when tooth 267 is struck by the thick tooth of a register wheel, 226, see FIGURE 18, during rotation of a wheel 226 between the 9 and the 0 position, the arm 258 will be rocked in a direction opposite to the direction of rotation of the wheel 226 to shift the arm to the FIGURE 18 position wherein its pin 261 is in the rear arm of the V slot. Pin 261 and its lever 263 will be retained in this position by means to be later described and will retain arm 258 in the set position with the teeth 266 still clear of the aligned register wheel 226. During a subtraction entry, the cooperation of the thick tooth of wheel 226 and tooth 267 of arm 258 will be the same as above except that wheel 226 is rotating in the opposite direction and will therefore shift arm 258 to the FIGURE 22 position with pin 261 in the opposite arm of the V slot of arm 258.

Despite the urge of spring 264 tending to move pin 261 upwardly and rotate arm 258 from the FIGURE 18 or 22 positions, the levers 263 are held in the positions of those figures while the register wheels 226 are in engagement with type bars 132, by a universal bar 269 overlying the front arms of levers 263. A slotted leaf spring 270 secured to the under part of bar 269 is the actual contact between bars 269 and levers 263 and permits a cushioned engagement between the bar and the levers. The universal bar 269 includes two depending ears which are pivoted on rod 231 outside of the register frame 229 and may be urged counterclockwise in FIGURE 1 by a torsion spring 271, FIGURES 4 and 17–23. The left hand ear of bar 269 is provided with a fixed pin 272 which rests against a cam edge 273 of a plate 275 fixed to the left side wall 49. As the register frame 229 is rocked by link 232 to move the register wheels 226 into engagement with the type bars 132, pin 272 is moved along cam edge 273 to move the bar 269 clockwise into the position shown in FIGURES 18 and 22 where it will prevent levers 263 from rising above their detenting positions.

As the register frame 229 is restored to its normal position after an entry, additive or subtractive, the bar 269 retains its position relative to the register frame 229 until pin 272 moves out of the concentric portion at the lower edge of cam edge 273. During further restoration of frame 229, the bar 269 is released to move to its original position as in FIGURES 19 and 23, releasing levers 263. Those levers which have their pins 261 in either arm of the slot of the arm 258 are free to rock under the urge of their springs 264 and will lift their pin 261 to the upper end of the slot in arm 258 causing the arm 258 to rock to the FIGURE 19 or FIGURE 23 position. During such movement of arm 258, a tooth 266 will engage one of the teeth on the register wheel 226 aligned therewith and turn that wheel 226 one additional step to transfer a tens digit. It will be clear from FIGURES 17 to 23 that the direction of rotation of a wheel 226 by arm 258 for the transfer of a ten will be the same as the direction of rotation of the lower wheel 226 which struck the tooth 267 to shift the arm 258 from its detented position and thus the ten digit will be transferred in the proper additive or subtractive sense. The timing of the movements of bar 269 are as indicated in the third and fifth lines, "Carryover Addition" and "Carryover Subtraction" of FIGURE 28 when it may be seen that during the "conditioning" time, bar 269 will be holding the levers 263 against transferring movement and will permit such movement during the "carry position" time.

If any wheel 226 stands at the 9 or 0 position and receives a tens transfer moving it to 0 or 9, the thick tooth on such wheel will rock the arm 258 associated therewith to release pin 261 from the detent notch 262 and the spring 264 will immediately rock lever 263 to cause that arm 258 to rock and transfer a tens digit into its register wheel, thus providing for a transfer on a transfer when required.

At the end of a cycle of gear 46, the bar 269 is again operated to restore to the detented position any levers 263 and arm 258 which have operated to transfer a tens digit. As shown in FIGURES 4, 17 and 20, an arm 276 having a turned out cam surface 278 and a bent off ear 279 is pivoted on a stud 281 in the left side wall 49. In the normal position of the machine, ear 279 of arm 276 rests just in front of a second pin 282 in the left ear of bar 269. Near the end of a cycle of gear 46, pin 169 thereon will engage the cam surface 278 as indicated in FIGURE 20, to rock arm 276 counterclockwise to the FIGURE 20 position wherein ear 279 engages pin 282 to rock bar 269 clockwise. This motion of bar 269 will rock levers 263 and thereby arms 258 to their original positions except that pin 261 will be in the lower point of the V slot of arm 258. Just prior to the arrest of gear 46 at the end of the cycle, pin 169 leaves the cam surface 278 to release arm 276 and bar 269 allowing pins 261 to move slightly upward into the detent notches 262 of arms 258. It will be noted in FIGURES 19 and 23, that the path of teeth 266 of arms 258 will, in their return from transferred position slightly engage a tooth of the aligned register wheel 226 and hence will rotate the wheel 226 slightly when arms 258 are restored but this movement of wheel 226 is not sufficient to move a tooth past the high point of the detent spring finger 241 which will restore wheel 226 to its correct position as the tooth 266 leaves the wheel 226.

Total taking operation
(FIGS. 1, 2, 15, 16, 24, 25, AND 26)

A total of the entries made in the register wheels 226 is taken by engaging the register wheels 226 with the racks of the type bars 132 when the type bars have been moved rearwardly to their 0 positions and then releasing the type bars 132 for further rearward movement. The wheels 226 are arrested when they reach their 0 position to stop each type bar 132 at a printing position corresponding to the original digit representing position of its register wheel 226. This operation will be seen to be the same as the subtraction operation described above except that all of the type bars 132 are released and it is the register wheels 226, not the pin carriage 96 which controls the arrest of the type bars 132.

The subtraction initiating key 61, FIGURE 7, when it is operated with pin carriage 96 in its home position, will initiate a total taking operation causing a shift of the cam follower arm 245 into engagement with cam 82, FIGURE 4, so that the register wheels 226 will be in mesh with type bars 132 during their rearward movement as above described. The depression of key 61 also releases the type bars 132 from the stop plate 157 on the pin carriage 96 to permit free rearward movement of the bars 132 during an ensuing machine cycle. As clearly shown in FIGURE 26, plate 157 has at its left front end, an ear 284 depending downwardly therefrom which ear 284 is, when pin carriage 96 is in its restored position, over a leg of a pivoted cradle 285. Cradle 285 is urged clockwise in FIGURE 26 about its pivots in the side walls 34 and 49 by a spring 287 to hold another leg of cradle 285 against the right end of lock lever 254 so that when lock lever 254 is rocked by depression of key 61 to initiate a machine cycle, cradle 285 will rock counterclockwise to lift stop plate 157 above the ears 154 of type bars 132 if the pin carriage 96 is in its home position, otherwise plate 157 cannot be raised by operation of key 61.

It is also necessary that each register wheel 226 be arrested when it reaches its 0 position during the ensuing rearward movement of bars 132 from their 0 positions and this arresting is done by a slotted stop bail 288, FIGURES 15 and 16. Stop bail 288 is pivoted in the register frame 229 with a stud 290 projecting through the left side of the frame 229 and a stop finger for each register wheel extending forwardly in vertical alignment with the wide tooth on the wheel 226. A spring 291 connected to stud 290 urges stop bail 288 counterclockwise to hold the bail against a stop 293 in the register frame 229 with the stop fingers clear of the path of the wide teeth or the register. Normally, the bail 288 does not move in the frame 229 but when a total taking operation is being performed, the bail 288 will be swung to the FIGURE 15 position wherein the stop fingers will intercept the wide teeth to arrest each register wheel at the 0 position and the associated type bar 132 at a digit corresponding to the digit originally represented by the wheel position. Such control over bail 288 is dependent upon the position of pin carriage 96. Referring to FIGURES 24 and 25, a cam 294 is secured to pin carriage 96 and in the restored carriage position will lift the depending right end of an arm 296. Arm 296 has, on its left end, lugs which pass through slots in keyboard plate 89 to provide a pivot and is urged to lie flat against plate 89 by a compression spring 297 pressing on its upper surface. A bent lever 299 is mounted on the upper keyboard plate 69 on a stud 300 and will be pivoted about a bend line near its center by a compression spring 302 about stud 300 to maintain a depending tail at its right end in contact with the right end of arm 296. The left end of lever 299 passes through a slot in an arm 303, see FIGURES 1 and 27, pivoted on a stud 305 in the forward end of side wall 49 and extending rearwardly to alongside the left side of register frame 229. So long as the pin carriage 96 is out of its restored position, springs 297 and 302 rock arms 296 and 299 to hold arm 303 in its FIGURE 1 position wherein pin 290 of the stop bail 288 will, when the register frame 229 is rocked clockwise, move idly in a slot in the rear end of arm 303. During a cycle in which the pin carriage 96 is in its restored position and type bars 132 are free to move rearwardly as set out above, arm 290 and lever 299 are rocked to lower arm 303 to bring an edge of arm 303 into the path of movement of pin 290 as shown in FIGURE 15. Movement of register frame 229 to rock the wheels 226 into engagement with the bars 132, will simultaneously then rock bail 288 to the register wheel arresting position enabling the total in register wheels 226 to be printed. Before the type bars 132 are returned to their home position, cam 82 will rock frame 229 back to its normal position so that the register wheels 226 remain at 0 as is required for total taking.

*Insignificant zero elimination*
(FIGS. 2 AND 27)

As described above, all of the type bars 132 are brought to the 0 printing position before the register wheels 226 are engaged for a total taking operation. In such a case, the correct total will be printed but the type bars 132 to the left of the first significant digit will print 0's which is undesirable and mechanism is therefore provided to prevent printing of such insignificant 0's. This mechanism is rendered effective by arm 303 when it is in its lowered position during a cycle, which as shown above will be a total cycle. Each type bar 132, see FIGURE 27, except the two of lowest denominational order, has secured to it near its rear end, a small triangular stop block 306. Pivoted on a bar 308 in register frame 229 are a plurality of bell cranks 309, one for each type bar 132 except the two of lowest denominational order. The bell cranks 309 have a tail at their rear end which tail is positionable in the path of stop blocks 306 and will arrest a type bar 132 before it moves rearwardly into a printing position. The other end of each bell crank 309 is formed with a nose which rides on the hub 240 of the numeral wheel 226. The rear end of each bell crank 309 also has an ear 311 bent off to the left to rest over the next leftward bell crank 309 so that if any bell crank 309 is retained in a counterclockwise position, FIGURE 27, it will hold all lower order bell cranks 309 in the same position. The leftmost bell crank 309 has near its rear end a pin 312 bent to lie on a surface of arm 303. When arm 303 is in its upper position as it is during adding and subtracting cycles in which the pin carriage 96 is indexed to its left, pin 312 is raised to hold up all bell cranks 309 so that the bars 132 are controlled by the pin carriage 96 and stop plate 157. The lowering of arm 303 as pin carriage 96 is restored to its home position, frees all the bell cranks 309 to drop the rear ends until their other arm rest against the hub 240 of the associated register wheel 226. Each register wheel 226 which stands at a 0 position has the notch in its hub 240 positioned so that the bell crank 309 may drop enough to move the tail at its rear end into the path of stop block 306 and arrest the type bar 132 before it reaches any printing position. If, however, any register wheel 226 of higher denomination prevents such dropping of bell crank 309, the overlapping tails 311 will hold up the bell crank 309 to its right and permit the type bar 132 to advance to the 0 position. Thus during totals, only the type bars 132 corresponding to non-significant digits in a total will be held in their non-printing position by the bell cranks 309.

*Sub-total taking operation*
(FIGS. 24 AND 25)

A sub-total taking operation is one in which the amount accumulated in register wheels 226 is printed but the register wheels are not restored to their 0 positions at the end of the operation. In such an operation, the add key 63, FIGURE 7, is used to initiate the cycle which will then be the same as the total taking cycle above described except that the register wheels 226 will be retained in engagement with the type bars 132 until the bars are restored to their 0 positions near the end of the cycle. The arm 252, FIGURE 24, which is operated by the total key 61 to initiate a total cycle, will also be operated by the add key 63 if the pin carriage 96 is in its home position. The arm 296 will be held up, while the pin carriage 96 is in this position, to raise the right end of a link 314 connected at its left end to arm 252. The right end of link 314 is formed with a slot embracing a pin 315 on arm 296 and also has a depending tail passing through the keyboard plate 89 into alignment with an arm 316 at the rear end of the cradle 74 operated upon depression of key 63. When arm 296 is raised, depression of key 63 will, through cradle 74, shift link 314 to the left to shift arm 252 for a total taking cycle as has been set out.

To prevent the disengagement of register wheels 226 after the total has been printed, a latch lever 317 is pivoted on a stud 318 in the right side wall 34 and is urged counterclockwise by a spring 320. A stop lever 321 is pivotally mounted on a post 323 in the upper keyboard plate 69 and will be frictionally held in any position by an ear at its rear end which is bent into resilient contact with post 323 as indicated in FIGURE 25. Stop lever 321 has its forward arm positioned to the left of an upstanding tail on link 314 and has its rear arm positioned above lever 317. Lever 317 will be retained in its FIGURE 24 position until a machine cycle is started, by the engagement of its forward end with the projecting right end of universal bar 140. After any machine cycle has started and bar 140 moved rearwardly, lever 317 is released to move against the rear arm of lever 321. When link 314 is moved to initiate a total cycle, it swings lever 321 to move its rear arm from above lever 317 which thereupon continues to rock counterclockwise until it moves behind an angle plate 324 secured to register frame 229 to hold the frame 229 in its rocked position. Now when cam follower 245, FIGURE 4, is restored by cam 82 near the mid-cycle time, the register frame 229 cannot be restored and spring 238 will stretch to put pressure on link 232. After type bars 132 are returned to their 0 positions, and register wheels 226 repositioned at the positions they had at the start of the machine cycle, universal bar 140 raises the forward end of lever 317 to release lever 317 from angle plate 324 and free register frame for movement to the disengaged position by spring 238. Lever 321 is thereafter restored to its normal effective position by a lug 326 secured to pin carriage 96. The restoration of pin carriage 96 is, as previously stated, to a position to the right of its rest position and it is during this excess restoration that lug 326 restores lever 321 to the effective position. When pin carriage 96 is released to the action of its spring 99, it moves leftward sufficiently to enable link 314 to move lever 321 to the ineffective position without interference from lug 326.

*Symbol printing*
(FIGS. 6, 24, AND 26)

It is desirable to indicate on the paper tape 184 along with the printed amount, which of the above operations was performed when said amount was printed. A symbol type bar 326, similar in general to the type bars 132, is positioned to the right of the bars 132. Symbol bar 326 is controlled in its movements by universal bar 140 and is urged rearwardly by a spring 327. FIGURE 26 but, since there are only three symbols to be printed in the present embodiment, the slot for its tail in the guide plate 134 is only long enough to permit the symbol bar 326 to move to bring the last of its symbol type to the printing point. Symbol type bar 326 is normally held from moving to printing position by a hook 329 bent off cradle 285 and positioned just to the rear of an ear on the front end of the bar 326 during such cycles. As cradle 285 is rocked in all subtraction, total, and subtotal cycles, the absence of a printed symbol will therefore indicate an added item.

When key 61 is operated with an amount indexed in pin carriage, the cycle is a subtract one and symbol bar 326 is permitted to move to its fullest extent to print a subtract symbol. Rocking of cradle 285 by key 61 through arm 252 and lever 285 frees symbol bar 326 during such a subtract operation.

A total cycle is also initiated by operation of key 61 and the symbol type bar 326 will be released in the same manner as above. During total taking cycles, however, the pin carriage 96 is in its home position and is utilized to arrest bar 326 one space before it reaches the subtract symbol printing position, that is, at a total symbol position. As shown in FIGURE 26, the symbol bar 326 has a shoulder 330 and the pin carriage 96 stop plate 156 has a depending lug 332 at its left end. With pin carriage 96 in its unindexed position, shoulder 330 will be arrested by lug 332 to stop the symbol bar 326 in the total symbol position.

The major distinction between sub-total taking operations and total taking operations is performed by the rocking of lever 317 and this rocking is utilized to arrest symbol bar 326 prior to its movement into the total symbol position, that is, at the sub-total symbol position. Referring to FIGURE 24, the symbol type bar 326 has an ear 333 bent to the right from its forward end. In subtraction and total operations, this ear 333 will pass beneath a tail 335 bent leftward from the front end of lever 317 but when lever 317 is rocked during a subtotal cycle, the tail 335 moves downwardly into the path of ear 333 to arrest the bar 326 with the sub-total symbol in printing position.

Thus the symbol type bar is held out of printing position during addition, advances to its rearward limit during subtraction, and is arrested by lug 332 during total cycles and by tail 335 during sub-total cycles to position the proper one of three symbol type at the printing position.

The above description of the preferred embodiment of my invention should not be taken as limiting the scope of my invention as substantial variations of structure and function are possible without departure from the scope of the invention as set out in the following claims.

What is claimed is:

1. A tens transfer mechanism for a machine of the class described having a plurality of differentially movable rack members, a like plurality of register wheels, a frame supporting said register wheels and shiftable to move said wheels into and out of engagement with said rack members, each register wheel having a projection thereon, and an aligner for each register wheel to restore the register wheel from a misaligned position into an aligned position, said transfer mechanism comprising a plurality of arms pivoted on said frame for shifting with said register wheels, each arm being in alignment with one of said register wheels and having a projection in the path of the projection of the next lower denomination wheel, a detent for each arm, each detent having a part to hold its associated arm in a normal position from which position said arm may be moved by engagement of the projection on said next lower denomination register wheel with its said projection, each arm having a cam slot into which said part of its associated detent moves as said arm is moved, means to urge said detent to move said part to an end position in said slot to thereby move said arm to effect a tens transfer into the aligned register wheel, and means to prevent such movement of said detent while said register wheels are in engagement with said rack members.

2. An adding machine of the class described comprising a plurality of differentially movable rack members, a plurality of register wheels, a support mounting said register wheels for engagement with said rack members, a plurality of aligners mounted on said support, one for each register wheel, to urge said register wheels into an aligned position, cyclic mechanism to drive said rack members and to operate said support to move said register wheels into engagement therewith for operation by said rack members, a tens transfer mechanism between each adjacent pair of register wheels, each tens transfer mechanism comprising an arm pivotally mounted in said support in alignment with one of said pair of register wheels, each arm having a tooth to actuate said one register wheel, a projection operable by the other of said register wheels as said other wheel moves between a 9 position and a 0 position to move said arm, and a cam slot therein, a detent arm having a portion normally retained in a holding part of said cam slot of said arm but shifted into an actuating part of said slot when said arm is moved, means to drive each detent arm in said actuating portion of said slot to drive said arm and thereby move said one register wheel for a tens transfer step and common means on said frame to prevent driving movement of any of said detents so long as said register wheels are in engagement with said rack members.

3. An adding machine as set out in claim 2 including a part operable by said cyclic mechanism to operate said common means to restore said detent arms past their normal retained position to thereby return said arms to an original position wherein said portion of each said detent arm will be retained in the holding part of said cam slot upon release by said common means.

4. An adding and subtracting machine of the class described having a plurality of differentially movable rack members, a register wheel for each rack member, a shiftable support in which said register wheels are rotatably mounted, a plurality of aligners mounted on said support, one for each register wheel, to urge said register wheels into an aligned position, cyclic mechanism to move said rack members from and to a home position and including selectable members to shift said support to engage said register wheels with said rack members during either movement of said rack members, a tens transfer mechanism between each adjacent pair of register wheels, each tens transfer mechanism including a transfer arm pivotally mounted in said support, each transfer arm comprising a pair of teeth aligned with a higher denominational one of said pair of register wheels and a projection engageable by the lower denomination one of said pair of register wheels as said wheel moves between a 0 and a 9 representing position to move said transfer arm, each transfer arm being formed with a substantially V-shaped slot having an inverted notch at the intersection of the arms of the slot, a resiliently urged driving arm having a portion normally retained in said inverted notch but moved into one arm of said slot as said transfer arm is moved by the lower one of said pair of register wheels, a common restraining bail pivoted on said support, a stationary cam member to rock said bail into engagement with said driving arms as said support is shifted to engage said register wheels with said rack members and to release said driving arms after disengagement of said wheels and members whereby such transfer arms as have been moved are driven in a tens transfer movement by said driving arms.

5. An adding and subtracting machine as set out in claim 4 including a cyclically operated member engageable with said restraining bail while said support is in the register wheel disengaging position, for actuating said restraining bail to restore said driving arms through and past their normally retained position thereby restoring said transfer arms to their control position wherein said driving arms will, upon release by said restraining bail, be retained with said portion engaged in said inverted notch.

References Cited in the file of this patent
UNITED STATES PATENTS

| | | |
|---|---|---|
| 1,839,211 | Foothorap | Jan. 5, 1932 |
| 2,203,336 | Landsiedel | June 4, 1940 |
| 2,307,669 | Crosman | Jan. 5, 1943 |
| 2,424,359 | Liljestrom et al. | July 22, 1947 |
| 2,708,550 | Maier | May 17, 1955 |
| 2,715,999 | Butler | Aug. 23, 1955 |
| 2,746,381 | Parker et al. | May 22, 1956 |
| 2,753,111 | Tancred | July 3, 1956 |